INVENTOR.
JAMES L. BRAXTON, JR.

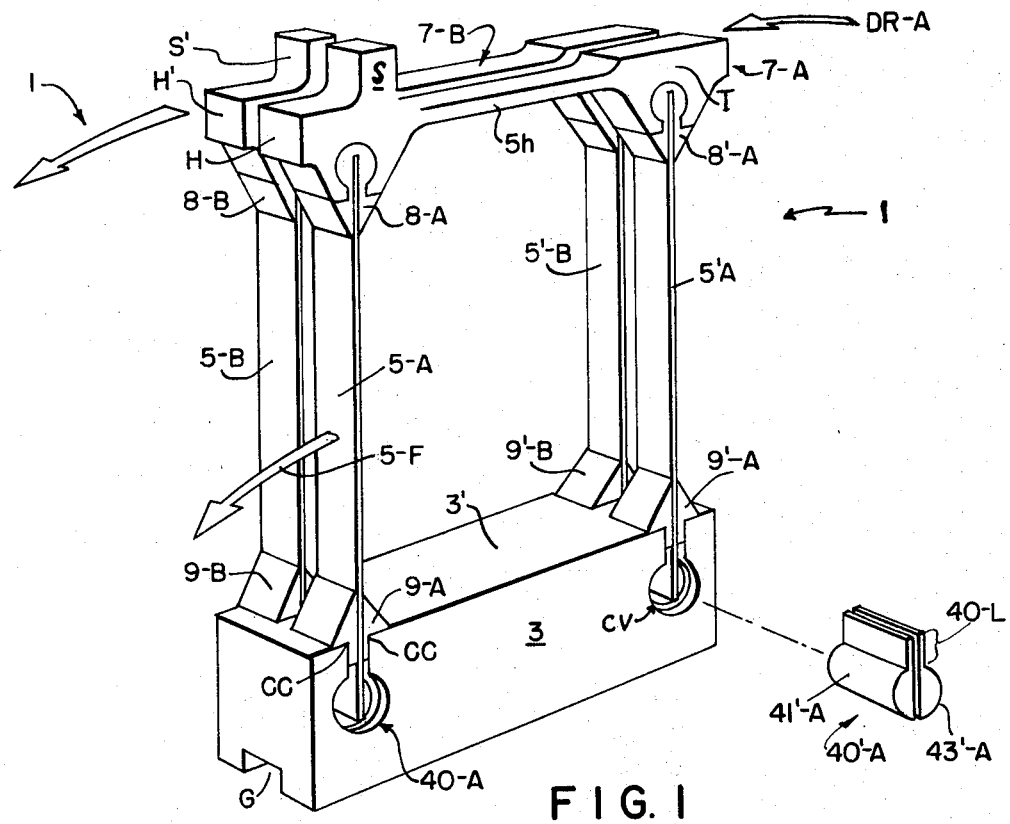
FIG. 1
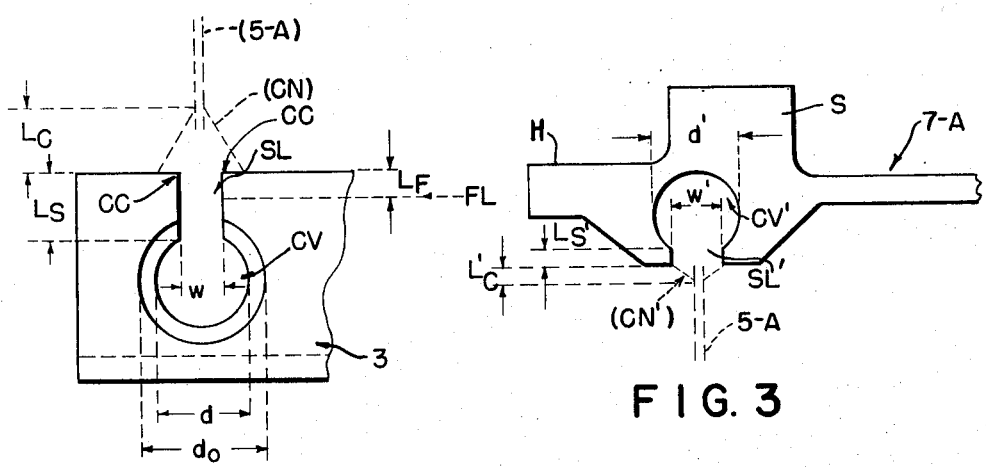
FIG. 2
FIG. 3
INVENTOR.
JAMES L. BRAXTON, JR.
BY John J. McCormack
ATTORNEY

3,354,820
PRINT HAMMER SUPPORTING SPRING ASSEMBLY AND METHOD OF MAKING SAME
James L. Braxton, Jr., Moorestown, N.J., assignor to Honeywell Inc., Minneapolis, Minn., a corporation of Delaware
Filed Aug. 26, 1966, Ser. No. 575,443
23 Claims. (Cl. 101—93)

The present invention relates to a spring mount assembly; more particularly, it relates to a bonding structure and associated methods for joining the springs of such an assembly to associated relatively rigid parts more simply, conveniently and effectively.

As workers in the art well know, the joining of mounting springs to the relatively rigid base and slug members in a hammer assembly for high speed printers involves many problems. One bothersome such problem is maintaining a precise orientation of the spring relative to the rigid member, for instance, so that the hammer slug may be operatively driven in precise alignment—something critically important for high speed printers. Such problems have heretofore been met by complicated fabrication procedures, such as by maintaining the elements in a jig, pouring and molding settable bonding material therein and thereafter curing them, etc. It is well known that such procedures characteristically make it difficult to maintain the required precise alignment, especially when the bonding materials, themselves, introduce some relative distortion between the spring and the member to which it is bonded. The present invention provides a simplified bonding arrangement dispensing with many of these fussy bonding procedures heretofore used, yet maintaining the precise alignment required.

Another difficulty associated with bonding mounting springs to hammer members is that of spring fatigue and breakage. This is an outstanding problem when such hammer assemblies are employed in high speed printers, since they are actuated under high force at extremely high cycle rates and unless the actuation is precisely controlled over an extremely long life, are unsatisfactory, especially when associated with high speed electronic computer systems. For such applications the required operative life is extremely long, often approaching a billion cycles and far beyond any related spring applications. Moreover, it is economically important that such members be reliable and maintenance-free since their failure typically forces the shut-down of the very expensive computer system for a period which often costs hundreds of dollars per hour. The present invention will also be seen to provide an advantageous, highly reliable, bonding arrangement providing improved long life and reliability for such hammer mounting springs.

Thus, it is one object of the invention to provide improved spring mounting assemblies, especially for print hammers. A related object is to provide such assemblies having an improved spring bonding arrangement. Another related object is to provide such a bonding arrangement having advantages of simplicity of manufacture, reliable maintenance of precise hammer alignment, protection of associated springs for long life and reliable operation, and the like. Still another object is to provide such a bonding arrangement using both a rigid solder material together with elastomeric material for the bond, thus providing fabrication conveniece, together with improved spring performance, such as in the control of the spring-flexure characteristics adjacent the bond.

The above and other related features, objects and advantages are achieved according to one embodiment of the invention by inserting flat flexure mounting springs in a cavity provided in the rigid member, providing a rigid solder bond therebetween in the inner portion of the cavity, rigidly joining the spring to the member, and also providing a relatively resilient elastomeric bond filling the remainder of the cavity and therebeyond for graduating the spring resilience adjacent the solder bond.

Further objects and features of advantage of the present invention may become apparent upon consideration of the following detailed description of certain embodiments thereof, especially when taken in conjunction with the accompanying drawings wherein like reference numerals denote like parts, namely:

FIGURE 1 illustrates, in perspective view, a preferred embodiment of a slug mounting assembly fabricated in accordance with the present invention;

FIGURE 2 illustrates a front view, somewhat enlarged, of the area surrounding one of the lower flexure joints in the FIGURE 1 embodiment, all except the base member being indicated schematically and in phantom here;

FIGURE 3 is a front view similar to FIGURE 2, but illustrating an upper joint area of the FIGURE 1 embidiment.

Figure 4:
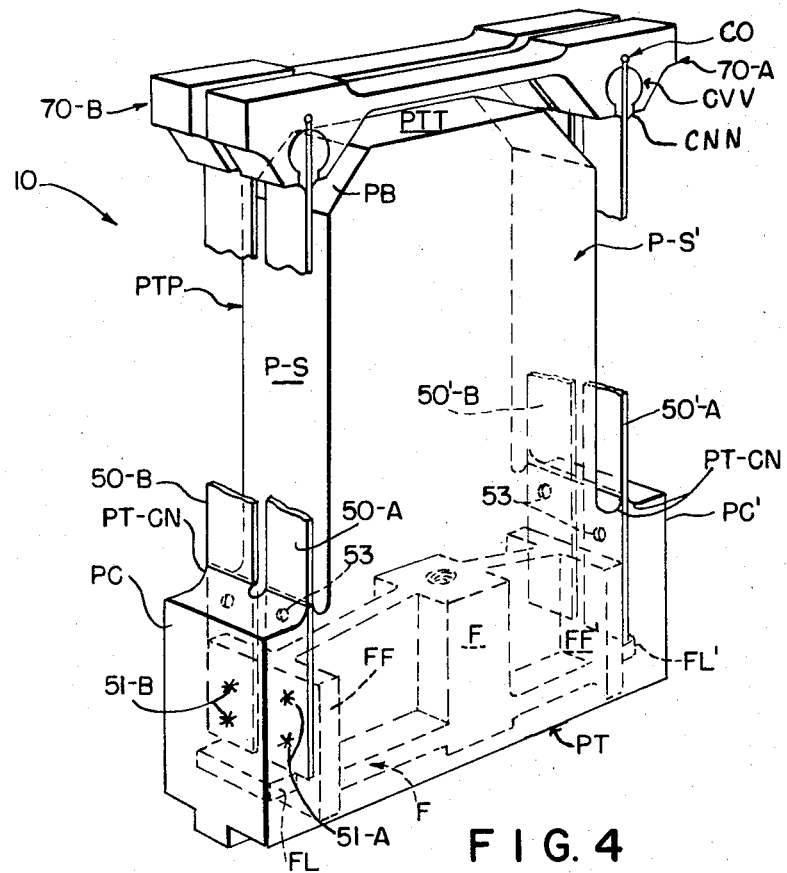
FIGURE 4 is a perspective view of an alternate embodiment to the assembly in FIGURE 1.

With reference now to FIGURES 1–3, a preferred embodiment of the present invention is shown, generally comprising a double-print-hammer assembly 1 adapted to be mounted in a high speed printer as known in the art. Assembly 1 generally comprises a common base member 3 in which two pairs of like mounting springs, or leaf flexures, 5-A, 5-B are bonded in a prescribed manner, described below. Flexures 5 are projected in a prescribed manner from base 3, each flexure also being bonded at the other end thereof in a prescribed manner to a respective hammer or slug, 7, for flexural pivoting thereof relative to base 3. Base 3 includes positioning and attachment means, such as slot G known in the art for securing thereof to the printer frame in conjunction with a plurality of other like assemblies. Base 3 comprises a rigid, metallic member formed to include a pair of flexure-bonding cavities CV bored across the body thereof, each cavity CV communicating with a top surface 3' of base 3 through a prescribed rectilinear slot constriction SL. Cavities CV may, of course, be machined (e.g. "C' bored")—may be molded or otherwise formed in base 3 as appreciated in the art. According to one feature of the invention, particularized below, one end of each of the four flexures 5 is bonded rigidly, and in prescribed aligned relation, in a respective one of cavities CV by means of a novel composite solder/elastomer joint, this joint being here indicated as comprising an inner solder plug 40, 40' (one in each cavity CV) and an outer elastomeric base fillet 9, 9' (one for each cavity CV, e.g. of urethane) molded about each flexure for joining thereof to base 3 in a prescribed base bond. This base bond will be seen to have a desirable graduated deflection characteristic for reducing stress, breakage, etc. of the flexures.

Slugs 7-A, 7-B are similar, each being comprised of a hard metal (e.g. Solar steel) and having, respectively, head portions (H, H'), stop portions (S, S'), shank portions 5h and tail portions T. The head and shank portions of each hammer are each provided (as indicated) with a bonding cavity CV' (FIGURE 3), similary in configuration and function to the aforementioned cavity CV in base 3. Slug cavities CV' receive the upper (slug) ends of a respective pair of flexures 5 together with surrounding bonding material. That is, the slug end of each flexure 5 is affixed in prescribed alignment with a slug in a respective hammer cavity CV', being bonded therein by an elastomeric (i.e. somewhat resilient, non-metal) slug fillet 8. Fillets 8 are preferably comprised of molded urethane, similar to the urethane base fillets 9 aforementioned. Thus, flexure 5–A, for instance, has the base-end thereof bonded to base 3, having been solder joined by solder plug 40–A in base cavity CV together with associated base fillet 9–A, filling the unsoldered remainder of respective slot portion SL of the cavity. Fillet 9–A also extends along flexure 5–A beyond base 5 and slot SL to smoothly, gradually join it to adjacent surface portions of the base, including top surface 3′. The opposite slug end of flexure 5–A is bonded in a prescribed manner for prescribed alignment with associated hammer 7–A, being bonded in respective cavity CV′ thereof with slug fillet 8–A filling the cavity and extending somewhat beyond as with fillet 9–A. Companion flexure 5–B is similarly bonded in cavities CV, CV′ while paired flexures 5′–A, 5′–B are likewise bonded between slug and base in cavities CV, CV′ with like elements characterized by like designations. These bonding elements, as well as the associated fabrication and assembly steps, are particularized below where the order of fabrication steps for all four flexures is also indicated.

Before turning to the particulars of the structural elements of hammer assembly 1, it will be instructive to consider the desired operating characteristics thereof, together with some of the problems that have plagued analogous prior art structures, both in operation and in assembly. It will first be understood that operating as a double print hammer mount, assembly 1 is one of many such which are installed in a printer apparatus, such as a high-volume, high speed printer in a data processing system. Each such hammer assembly brings associated heads in prescribed operable relation with respective print positions of the printer apparatus, also disposing the stricken portion of respective tails T adjacent respective hammer driving members, such as is indicated schematically for slug 7–A by "drive arrow" DR–A. Application of such a driving force will, of course, drive the associated head into printing impact, pivoting it on its flexure springs, about its juncture with base 3, as indicated by arrow 5–F. Those skilled in the art appreciate that the impact forces driving such hammers are relatively large, that the frequency thereof is relatively high and that they are required to operate reliably over an exceptionally long time. Customarily, hammer-stop means are provided (not shown) to limit the forward/backward excursions of the hammers and prevent overstressing and undue rebounding of the mounting flexures. Projections S, S′ may facilitate such stops and also engage helper return-springs where needed. It will nonetheless be appreciated that there is a rather severe, high-frequency, oscillatory stressing of flexures 5 transverse to their flat sides, i.e. in direction 5–F. Assembly 1 may typically be about 1¾ in. high x 1¼ in. long x ⅜ in. wide and spaced about 1 in. from a like adjacent hammer assembly. These dimensions indicate some of the spacing and mounting problems of such assemblies as well as the limits in size of parts.

Now, it will be appreciated that if plastic fillets 9 were removed and flexures 5 allowed (no stops) to deflect sufficiently to be stressed against the top corners CC of a respective slot SL, being rigidly anchored therein by solder plug 40, such engagement is likely to overstress and break these flat-leaf springs. A similar problem might be encountered at the slug end of each flexure where it confronts the edges of the channel communicating into slug cavity CV. However, there is little likelihood of the latter problem since the pivoting excursions of flexure 5 relative to slug 7, are relatively small.

It should further be appreciated that this impacting of a portion of flexure 5 against a corner may be damaging even though impact is never quite completed, but only near-approached For instance, if fillets 9 were to extend down into a corresponding cavity CV to fill the entirety thereof (replacing plug 40), a relatively greater flexure excursion would result from a given hammer thrust. When this causes the flexure to approach corners CC, or for other reasons, to experience a relatively large sharp stress gradient there, breakage can occur. The continued application of this stess has been observed to break down certain elastomeric fillet materials, causing it to fracture, crumble, separate from the sides of base 3, etc. Thus, if base fillets 9 alone comprised the join between a flexure 5 and the base 3, this compressing and loosening thereof would result in a consequent loosening of the associated hammer 7 with respect to the base 3—a result quite disastrous to the maintenance of proper hammer position.

It will be recognized that the base end of flexures 5 must be kept in very precise alignment with base 3 so as to position the associated hammer head properly with respect to the prescribed print position, this position being maintained throughout the long operational life of the hammer. For instance, a skewing impact of the drive means (DR–A) may tend to throw the associated hammer slightly sidewise as well as forward. Such a lateral skew should be opposed and can be prevented by the firm bonding of flexure 5 in base 3 using a solder plug 40. Workers in the art will also appreciate that it is very difficult to guarantee that optimal fabrication procedures will be followed, especially with inexperienced, unskilled labor, e.g. be followed precisely enough both to establish this prescribed positioning of flexure 5 initially and to maintain it during subsequent fabrication operations, such as the molding of fillets 9, etc. Consequently, it is a further feature of the invention that such a composite base joint of the invention may be very effectively and efficiently provided, yet with relatively unskilled labor and simple, convenient fabrication methods.

FIGURE 4 will be seen to indicate a modified double hammer assembly 10 which is similar in its general operational characteristics to the aforementioned assembly 1; however, being fabricated according to an alternate, somewhat different, embodiment of the invention. Here, the base member comprises a cast metal base-frame F, or other rigid frame, to which four similar flatleaf mounting flexures 50 are spot-welded (at 51), pairs of these flexures supporting a respective hammer 70 (like hammers 7 in FIGURE 1) and being bonded thereto in a prescribed manner, as detailed below. Thereafter, the entire base portion is potted in plastic to provide a molded plastic potting PT, surrounding casting F and base portions of flexures 50 adjacent the welds. Potting PT is preferably molded to also include a central stop portion PT extending upwardly from casting F to present a pair of opposed flexure-limiting stop surfaces PS, PS′ for flexure pairs 50, 50′, respectively.

*Spring bonding*

Referring now especially to FIGURE 1, it will be seen that mounting springs 5 may take the form of flat-leaf flexures, having a substantially rectangular configuration and a relatively high degree of flatness. For instance, it has been found preferable to use an extra hard stainless steel, flat-rolled "wire" (tempered at about 800° F. for about four hours). As noted below, it is preferred to roughen the ends of these steel flexure springs along the bonding surfaces thereof to promote good adhesion to the elastomeric (urethane) material. It has been found that a sandblasting treatment which roughens the surfaces to about 30–40 microinches is helpful for this. For improved anchoring purposes, it may also be desired to perforate these bonding surfaces, e.g. by punching one or more holes through each end, into which the urethane, and, especially, the solder, may flow to better grip the flexure.

One feature of the invention is a novel improved base bond, anchoring the base end of flexures 5 to base 3 to be rigidly and immovably fixed therein allowing only a relatively smooth flexure-pivoting (arrow 5–F) of the flexure/hammer array with respect thereto. This base bond comprises a composite joint using an inner rigid anchoring solder bond together with an outer, relatively flexible, elastomeric bond. It was found that using an elastomeric bond alone for this base bond was unsatisfactory, resulting in an unacceptably large number of flexure failures after a relatively short time. Such a purely-elastomeric bond (e.g. rubber) evidently permitted enough extreme, high frequency pivot-flexing to over-compress the elastomer material, as aforementioned, causing it to separate from base 3, to crumble and to generally separate the join. As a result of this breakdown, it appeared that the flexure was allowed to approach catastrophically close to exterior corners CC of cavity-slot SL resulting in the snap-fracture and breakage of many flexures after relatively short life.

On the other hand, it was found that using only solder for this base bond eliminated this loosening effect and maintaining a rigid bond between base 3 and the engaged end of the flexure. However, instances of spring fracture and failure were still observed too frequently after a relatively short life testing. Hence, it has been found preferable to employ a composite bonding arrangement generally comprising a prescribed rigid solder material, filling a portion of cavity CV, together with a prescribed resilient elastomeric material joining flexure portions adjacent the solder bond to base 3. Accordingly, the innermost portion of cavity CV is filled with solder material, preferably comprising an "expanding metal" (e.g. alloys of bismuth which expand on cooling and solidifying), of a relatively eutectic alloy (i.e. composition constant while changing state). Such an alloy is, conveniently, reliably fusible in situ, within the cavity, to thus form a rigid bond between flexure 5 and base 3. By expanding when it cools this solder assures a tight rigid bond therebetween. More preferably, a bismuth-base solder alloy, such as "Cerrotru" (Registered trademark of "Cerro de Pasco Co."), is preferably used for this, having a relatively reliable melting point of about 281° F.

It is preferred to use a solder alloy having a melting temperature that is low enough so as to be conveniently workable, yet high enough to be at least slightly above the curing temperature of the elastomer so that the latter may be cured "in situ," conveniently. This aforementioned Cerrotru alloy is also found preferable for this reason.

Another feature of the invention is that the solder alloy may be provided in a "half-plug" form to be pre-positioned in place in cavity CV, being shaped to surround the ends of the respective flexure while conforming to the cavity walls. Such a convenient preformed structure comprises the pair of half-plugs 41'-A, 43'-A constituting composite plug 40'-A, indicated in FIGURE 1. It will be observed that each half-plug is pre-shaped to roughly assume the intended configuration in cavity CV. The convenience of using such half-plugs will appear from the description below of the method for fabricating assembly 1. Additionally, it may, in certain cases, be desirable to fix the longitudinal position of plugs 40, that is, fix them along the longitudinal axis of respective cavities CV. In such a case, enlarged rivet-like heads may be allowed to form on both ends of the plug halves to so fix them in base 3. To effect this, an annular seat is counter-bored to surround cavity CV on either end thereof and plugs 41'-A, 43'-A melted into them, hardening there to provide the enlarged terminal cap portions.

According to another feature of the invention, the other portion of the composite bond between each flexure 5 and base 3 comprises an elastomeric fillet 9 as aforementioned. Base fillets 9 are shown extending along each flexure from where it emerges from solder plug 40 to have a gradually decreasing cross-sectional width, thus providing the flexure with a gradually decreasing stiffness, or increasing resilience adjacent the solder bond. Fillets 9 are preferably comprised of a flexible, polyurethane potting compound (e.g. RU–2085 by Hysol Corp.) which may be conveniently applied after the flexures are affixed to the base 3 by the aforementioned solder plugs. Fillets 9 may be molded in place with an open mold. Such a urethane compound can typically be cured "in situ" at about 250° F., i.e. advantageously somewhat below the melting point of the "Cerrotru" solder plug. Urethane is preferred to various rubber compositions since it is convenient, can be molded.

With particular reference to FIGURE 2, the following dimensions have been found satisfactory with the above-described urethane/Cerrotru bond in the embodiment of FIGURE 1. Cavity CV is C-bored to a substantially cylindrical cross-section with a diameter $d$ of about 0.125 in., enlarged end bores of about 0.156 in. ($d_0$), a slot portion about 0.062 in. wide ($w$) with a depth LS of about 0.125 in. The base fillet extends down into slot SL, preferably, to a depth $L_F$ of about 0.060 in. to a level FL therein, the fillet also extending, along dimension $L_c$ above top 3' in somewhat conical, "continuously-decreasing-thickness" fashion, a distance $L_c$ of about 0.10 in.

A relatively similar, molded urethane bond (or similar elastomeric potting compound) may be provided to comprise hammer fillet 8 (shown in phantom at CN') joining the upper end of flexures 5 to a respective hammer 7, in a respective hammer cavity CV' therein. An open-mold process may similarly be used to provide this fillet and the plastic compound cured in situ as before, the compound being provided to fill cavity CV' surrounding the associated end of flexure 5 and, if necessary, extending somewhat outward from this cavity in decreasing-thickness fashion along flexure 5, as with companion base fillet 9 and with similar effect. It will be noted that with this bond, no rigid join is provided between flexure 5 and hammer 7 as was effected between base 3 and the flexure (through solder plugs 40), it being found, as aforementioned, that the relative stresses therebetween evidently do not usually require such a bond in the usual case. However, such a rigid bond may be provided when necessary, one form thereof being indicated in the assembly embodiment 10 in FIGURE 4.

Representative dimensions of cavity CV' are indicated in FIGURE 3, similar to the showing in FIGURE 2 aforementioned. Thus, cavity CV' may be seen to comprise a generally cylindrical bore having a diameter $d'$ of about 0.125 in. and a slot portion SL' having a width $w'$ of about 0.062 in. and a depth $L'_s$ of about 0.06 in. Schematically-indicated hammer fillet CN' may extend beyond hammer 7–A (along associated flexure 5–A) a distance $L'_c$ of about 0.100 in.

The features and advantages of the above-described hammer assembly 1 may be enlarged upon and the aforementioned structural characteristics summarized by the following description of an advantageous method of fabricating and assembling this hammer assembly. As a first step it is preferred to insert solder plug halves 40, 40', into cavities CV with the associated pair of flexures 5 between each pair of plug halves as indicated (e.g. the base ends of flexures 5'–A, 5'–B between plug halves 43'–A, 41'–A in C-bored cavity CV). The base/flexure assembly is then fixed in a jig adapted to carefully establish the prescribed relative positioning and alignment thereof so that when the solder bonds the flexures to base 3, this orientation may be maintained—something quite critical for proper orientation of the print hammers supported thereby, as will be recognized. After jigging, the bonding of the solder may now be initiated, such as by heating the plug-halves to fuse them adherently to the sides of cavity VC and to the surfaces of intermediate flexures 5. The Cerrotru will typically expand about 3% of its volume. Either with a jig or otherwise, this solder material may be dammed in cavity CV so as not to run out when it is so fused. Preferably, cavities CV include counter bores [diameter $d_0$] into which the solder will be flowed. The solder bond will hold the flexure firmly and rigidly in the base cavity and prevent it from twisting, misaligning and loosening, e.g. better than a purely elastomeric bond can.

Next, the four urethane base fillets 9 are provided, each bonding a respective flexure 5 in the unfilled remainder of slot SL. above the solder bond; also adhering to the upper base surface 3'. These stress-graduating fillets decrease the stress (shear) gradient, along the flexure near the solder bond, help to gradually relieve severe bending there and otherwise relieve strain and prevent sharp stress (shear) discontinuities; for instance, lest the flexures break adjacent the solder bond or against slot corners CC. Such a stress-coupling fillet gradually, rather than discontinuously, restrains (or stiffens) these portions of the flexure during the pivoting of the associated hammer. The fillet is preferably molded to provide the indicated gradually decreasing (conically) thickness (FIGURE 1). The urethane fillet is thereafter heated according to a prescribed curing schedule for curing, as aforementioned. The resultant composite stress-streamlining bond uses the fillet as a coupling support of graduated resiliency, together with the rigid solder bond as an anchor. Workers in the art will appreciate that, for certain purposes, a staggered stack of flexures may couple the spring flexure to rigid member with some graduated resiliency, though this is much less convenient to fabricate, the parts being so small.

Having thus bonded base 3 and flexures 5, the flexures are next bonded, in pairs, to a respective hammer 7. Thus, the hammer-ends of the flexures are inserted into a respective one of hammer cavities CV', and a mold is provided around this zone. Thereafter, the urethane (or other elastomeric potting compound) is injected to be cured in place, thus bonding the associated hammer and flexure members.

It will be readily apparent to those skilled in the art that the novel structural features of the mounting arrangement 1 thus provide a great improvement in convenience of assembly and reliability of fabrication, one heretofore unobtainable in the art, as well as providing the aforementioned improvements in performance. For instance, such improved hammer assemblies have been observed to provide an extremely long working life over hundreds of megacycles typical usage with not a single failure. This is equivalent to continual (24-hour) operation, 5 days a week, for a period approaching one-half year. Such life-reliability is vastly superior to anything known before in the art, where failures of analogous conventional structures have occurred on the order of at least a few percent failures after just a few megacycles operation. It will be recognized by those skilled in the art that for many instances, such as with mounting assemblies in a high speed printer associated with a data processing system having an expensive hourly rental, failure of merely one such hammer mounting flexure is virtually as harmful as failure of all, the value of the parts being minor relative to the cost of system "down-time." For instance, a single high speed printer may typically incorporate as many as seventy hammer mounting assemblies and the down-time, labor expense, dismantling, etc. in replacing one broken hammer assembly is virtually the same as that for replacing several. Consequently, it is important in such applications to guarantee virtually 100% reliability over a prescribed life so that, for instance, all the hammer mountings may be periodically replaced on a schedule (after a prescribed minimum life), thus likely preventing any hammer failures at all. The invention will be seen to provide such reliability in a novel manner.

FIGURE 4 shows a hammer assembly 10 as a modified embodiment from assembly 1 in FIGURE 1 but functioning somewhat the same. Assembly 10 will suggest alternate construction to that of assembly 1. For instance, it was mentioned that at certain times, it may be preferable to rigidly join the hammer ends of the flexures (here indicated as 50) to the associated hammer slug (here indicated as 70). Such is indicated by the weld joint between flexures 50 and slugs 70 along a weld slot CO in slug cavities CVV. Thus, the cylindrical bore of cavities CVV, being about 0.087 inch in radius, may include a flexure-receiving slot CO about 6 mils deep and of a width slightly larger than the thickness of flexure 50, typically about 5 mils.

The flexure may be spot-welded, for instance, with an electron beam weld or otherwise firmly bonded, in this slot.

As another feature of the invention, a potting PT may be provided for assembly 10, being comprised of a relatively flexible potting compound, like that used for fillets 8, 9. Potting PT provides an encapsulated plastic base, a stop limit for the flexures and a graduated-resiliency coupling bond adjacent the flexure/base bond (at PT–CN). These features may be best indicated by describing the fabrication of embodiment 10, the general features thereof having been aforementioned. Thus, a rigid metal base is provided, being comprised of a central frame F which may be investment-cast, or otherwise formed, to include a pair of outboard bonding flanges FF, FF', each also preferably including flexure-positioning seats FL, FL'. Flexures 50 are thus welded, at 51, in pairs to a respective flange FF, being positioned therealong by stopping engagement against associated seat FL. It will be apparent that casting F is designed to be relatively lightweight, the central portion thereof being joined to flanges FF through thin rib members to thus minimize mass.

Next, the hammer ends of flexures 50 are inserted into respective slots CO in cavity CVV of the respective hammer 70 and welded thereto. Thereafter, an elastomeric bond, CNN, similar to fillets 8 in slugs 7 is provided to resiliently couple and bond the adjacent portions of flexures 50 to the associated hammer slug, along the sides of associated cavity CVV. For instance, urethane may be injection-molded therein to form bond CNN. Lastly, the entire assembly is mounted in a mold and a plastic potting compound is injected therein and is heat-cured in place to form potting PT adhered to the frame and flexure members. Potting PT includes a central, projecting stop portion PTP disposed between the opposed flexures 50–A, 50'–A and 50–B, 50'–B for engagement therewith. Stop projection PTP thus presents a pair of opposed stop surfaces P–S, P–S' for engaging these opposed pairs of flexures stop-limitingly. Projection PTP terminates short of engagement with hammers 70 along an upper surface PTT thereof, having beveled edge portion PB adapted to clear the hammer portions surrounding cavities CVV. Such a potted bonding/stop structure PT can advantageously also be made highly adherent to the metal structural portions of the hammer assembly, such as frame F and flexures 50. For instance, flexures 50 may be perforated for firmer bonding with the compound comprising potting PT, such as indicated through holes 53 punched through flexures 50.

Alternate improved hammer assembly 10 will be seen to provide most of the advantages of assembly 1 aforementioned, though in a somewhat different way. For instance, it teaches bonding flexures to base (Frame F) with the aforementioned desired rigidity and graduated stiffness by welding, then molding a portion PT–CN of the potting material along the flexures. The entire structure is thus placed in a mold and the potting compound (e.g. urethane) injected to fill the mold, thereafter being cured to form plastic base PT. This graduated stiffness is provided by the conical converging-thickness of portions PT–CN. Thus, the assembly and fabrication of alternate hammer assembly 10 will be seen to proceed in much the same manner as that of assembly 1 aforedescribed.

It will thus be seen that the objects of the invention, such as those set forth above, are efficiently attained. Since certain changes may be made in carrying out the above method and in the construction set forth, without departing from the scope of the invention and since, in some cases, certain features of the invention may be used to advantage without a corresponding use of other features, it will be understood that the foregoing descriptive matter and illustrations shall not be interpreted in a limiting sense, but only as illustrative of the best forms of the invention known in accordance with the provisions of the patent statutes.

For instance, it will be readily apparent to those skilled in the art that the principles of the present invention are otherwise applicable, for instance, for the flexure-mounting of other reciprocable elements besides print hammers, e.g. driving cam elements, card punches, document-feed means or the like, as individual elements or in groups whereby the bonding of the flexures to rigid members may be improved. Also, the indicated embodiments may be varied somewhat. For instance, a single base may support more or less than the two print hammers shown. Moreover, the elements may differ in configuration from that shown, e.g. flexure springs 5–A, 5–B may be stamped out of a single sheet of spring metal and thereafter separated, being left integral at their base ends.

Having now described the invention, what is claimed as new and for which it is desired to secure Letters Patent is:

1. In a flexure spring mounting arrangement wherein at least one flexure spring means is joined to a relatively rigid member at a bonding surface thereof so as to be bent flexingly with respect thereto, an improved composite joining arrangement comprising:

cavity means for each spring means extending into said surface of said member; metallic bonding means fixedly connecting one end of each said spring means to said member, at the inner portion of said cavity means; and elastomeric fillet means adhered between each said spring means and said member along a portion of said spring means adjacent said connection with said bonding means so as to graduate the stiffness gradient and damp out extreme stresses therealong.

2. The combination as recited in claim 1 wherein said bonding means is adapted to fuse with said member and each said spring means for a rigid bond in the innermost portion of said respective cavity means; wherein said fillet means fills the balance of each said cavity means; and wherein each said spring means comprises a flat strip flexure.

3. The combination as recited in claim 2 wherein said bonding means comprises a prescribed self-locking solder material; wherein said cavity means is formed to mechanically lock said solder bond therein; and wherein said elastometric fillet means is adhered in place between each said flexure strip and the outer portions of said respective cavity means.

4. The combination as recited in claim 3 wherein said solder material is adapted to be fused in situ between said strips and innermost portions of said cavity means and is adapted to expand upon cooling so as to tighten said mechanical locking in said cavity means.

5. The combination as recited in claim 4 wherein said cavity means is constricted relatively adjacent said surface so as to lock said solder material therein and wherein said fillet extends along said flexure strip portion in progressively decreasing cross-sectional thickness progresing away from said bond.

6. The combination as recited in claim 4 wherein said solder material comprises a bismuth-base alloy.

7. The combination as recited in claim 6 wherein said elastomeric fillet means is formed from a material curable in situ at a prescribed convenient temperature and wherein said solder alloy is selected to be fusable slightly in excess of said temperature.

8. The combination as recited in claim 7 wherein said solder bond is formed from a pair of mating solder plug portions inserted in said inner portion of said cavity means to be fused with the respective end of said associated flexure strip therebetween, rigidly joining said end to said member.

9. The combination as recited in claim 8 wherein each said cavity means is "C-bored" and is provided with a pair of enlarged seat portions at the outer ends thereof, said seat portions being adapted to be filled with said fused solder alloy for rigid longitudinal securing thereof; and wherein said elastomeric material comprises a urethane type potting compound.

10. The combination as recited in claim 9 wherein said rigid member comprises a hammer base having a pair of said constricted cavities "C-bored" therein; wherein said flexure means comprises at least one pair of said flexure strips, each strip having one end thereof so bonded in a respective one of said base cavities, each said pair of flexures being bonded at the other end thereof to support hammer slug means.

11. The combination as recited in claim 1 wherein said member is comprised of a rigid metal; wherein said bond connection comprises a welding between said flexure spring means and said metal member and wherein said elastomeric fillet means encapsulates and adheres the associated end of each said spring means, coupling it dampingly to said member.

12. The combination as recited in claim 11 wherein each said fillet means is comprised of a potting compound disposed and cured about said metal member and said respective spring means adjacent said weld; and wherein said potting compound additionally provides an encapsulated base about said member and includes stop projection means extending for stop-limiting engagement with said flexure spring means.

13. The combination as recited in claim 11 wherein said base member comprises a metal frame; wherein said flexure springs comprise at least one pair of flexure strips welded, at one end thereof, to opposing portions of said frame, and attached at their other ends, to a common pivoting load member adapted to be pivoted relative to said frame; wherein said potting compound is adapted to encapsulate said frame and portions of said flexure strips adjacent said weld; and wherein said compound includes a stop projection portion comprising a projection extending toward said load member between associated pairs of said strips so as to present opposed stop surfaces for each said strip.

14. In a hammer assembly including a rigid base member, a slug member and a pair of flexure strips mounting said slug member from said base member so as to be pivoted relative thereto at high speeds and under precise guided alignment over an extended operational life, the improvement in combination therewith of a composite bond arrangement between the base end of each said flexure strip and said base member, said bond arrangement comprising:

a pair of cavities provided in said member so as to include inner enlarged portions; rigid metal join means rigidly connecting the base ends of each of said flexure strips to said member at a respective one of said enlarged cavity portions; and graduated damping means coupling each said flexure strip to said base member resiliently, adjacent said respective rigid metal connection, thereby occupying outer portions of said cavities.

15. The combination as recited in claim 14 wherein said join means comprises a solder plug fused in place between each said base end and said innermost enlarged portions of said respective cavities; and wherein said damping means comprises an elastomeric fillet adhered between each said flexure strip and said base member adjacent said respective solder bond at least along the remaining portions of said associated cavity; said plug comprising a solder material adapted to expand upon cooling and thus lock itself securely in said respective cavity.

16. A high-speed printer including a frame, hammer means and associated drive means for selectively thrusting said hammer means from a rest position to a prescribed print position at very high speeds, said hammer means including at least one elongated type slug, a base member and at least one flexure strip mounting each said slug pivotally from said member, each said slug and said base member including a bonding cavity therein for receiving opposite ends of each said strip; the combination therewith comprising a composite bonding arrangement securing the associated end of each said flexible strip in said associated base member cavity, said bonding means comprising:

cool-expanding, eutectic, bismuth-base solder material fused in half-plug form between each said end and the inner portion of said respective base cavity; and resilient elastomeric bonding means adhered dampingly between said base means, including the outer portions of said associated base cavity, and each said respective strip along a portion thereof adjacent said solder bond, said bonding means being arranged to surround this portion adherently with continuously decreasing thickness proceeding away from said respective solder bond.

17. In an arrangement having print hammer means mounted from base means pivotingly on at least one flexure strip means, an improved method for connecting said strip means and said base means, said method comprising the steps of:

fabricating said base means to include a cavity across the width thereof for each said strip means; inserting each of said flexure ends into a respective one of said base cavities; maintaining all said means in prescribed fixed relation and therewhile inserting solder bonding means into each said cavity to be fused betwen the inner portion thereof and said respective flexure end to thereby rigidly fix the relative positions thereof; adhering flexible elastomeric material between each said end and base portions adjacent said respective cavity to extend adherently along a portion of said associated strip means inwardly from said solder bond so as to fill said respective cavity and surround said strip means portion with the thickness thereof decreasing convergently away from said bond to thus provide a rigidly fixed, yet gradually damped, base bond therefor.

18. A method for bonding a flexible spring member to a relatively rigid base member with improved maintenance of a fixed orientation therebetween as well as improved and extended operational life, no spring breakage and the like, said method comprising:

providing a cavity in said base member;
    rigidly bonding one end of said spring member to said base member at the inner portion of said cavity by fusing material therebetween; and
    coupling a graduated-flexibility damping means between said members, along a portion of said spring member adjacent said fusion bond.

19. The method recited in claim 18 wherein are included the steps of:

boring a cavity in said base member so as to include a cross-sectionally enlarged inner portion; inserting a base end of said spring member into said inner portion; selecting a solder material adapted to expand upon cooling after being melted and to fill much of said inner portion thereof; inserting said solder material into said cavity and melting it to thus bond said spring end and said member in said inner portion and to thereafter, expand sufficient to mechanically lock itself in said cavity firmly; and adhering elastomeric damping means between said flexure and said member along a spring portion adjacent said solder bond, such as to gradually relieve extreme stress discontinuities along said spring portion.

20. The combination as recited in claim 19 wherein said solder material is selected to comprise a bismuth-base alloy; wherein said damping means comprises a fillet of elastomeric material cured in place at a prescribed curing temperature to be so adhered, said alloy being further selected to be fused at a fusing temperature not greatly in excess of said curing temperature.

21. The combination as recited in claim 19 wherein said solder material is comprised of a pair of mating solder plug portions shaped to fit respective sections of said cavity, with said flexure and therebetween; wherein said cavity is "C-bored" to include an inner enlarged portion and is additionally counter-bored at the longitudinal extremities thereof to provide enlarged terminal seats; said plug-portions being inserted in a respective one of said cavities with said strip end therebetween and fused for said bonding as aforesaid and so that a portion thereof also fills said terminal seats for securing the solder bond longitudinally.

22. The combination as recited in claim 18 wherein said rigid base member comprises a metal base frame; wherein said spring member comprises flexure strips; wherein said rigid bond is providing by welding the base ends of said flexure strips each to an associated portion of said frame; wherein said damping means is provided by flowing an elastomeric potting compound about portions of said frame and about said spring members, at least adjacent said welds, and curing it both to encapsulate said frame portions and to provide said stress damping adjacent said welds.

23. The combination as recited in claim 22 wherein said potting compound is disposed and cured so as to also form a stop-projection portion adapted to stoppingly engage said flexure strips.

References Cited
UNITED STATES PATENTS

| | | | |
|---|---|---|---|
| 3,041,964 | 7/1962 | Simpson et al. | 101—93 |
| 3,144,821 | 8/1964 | Drejza | 101—93 |
| 3,145,650 | 8/1964 | Wright | 101—93 |
| 3,172,352 | 3/1965 | Helms | 101—93 |
| 3,289,575 | 12/1966 | Wasserman | 101—93 |

WILLIAM B. PENN, *Primary Examiner.*